No. 683,390. Patented Sept. 24, 1901.
O. DROSCHÜTZ.
KNEADER FOR DOUGH KNEADING MACHINES.
(Application filed Mar. 5, 1901.)

(No Model.)

Witnesses:
J. C. Lebret.
A. Witt.

Inventor:
Oskar Droschütz
By H. H. de Vos.
Attorney.

UNITED STATES PATENT OFFICE.

OSKAR DROSCHÜTZ, OF BAUTZEN, GERMANY.

KNEADER FOR DOUGH-KNEADING MACHINES.

SPECIFICATION forming part of Letters Patent No. 683,390, dated September 24, 1901.

Application filed March 5, 1901. Serial No. 49,889. (No model.)

*To all whom it may concern:*

Be it known that I, OSKAR DROSCHÜTZ, a subject of the King of Saxony, residing at Schlossstrasse 3, Bautzen, in the Kingdom of Saxony and Empire of Germany, have invented certain new and useful Improvements in Kneaders for Dough-Kneading Machines, of which the following is a specification.

My invention relates to a kneader for dough-kneading machines. This kneader consists of a Z-shaped rotary agitator whose middle bar forms acute angles with the two arms carrying knives.

Figure 1:
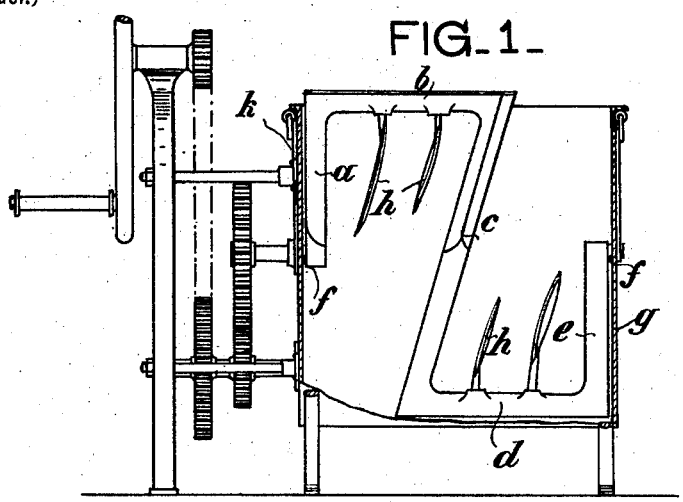
Figure 2:
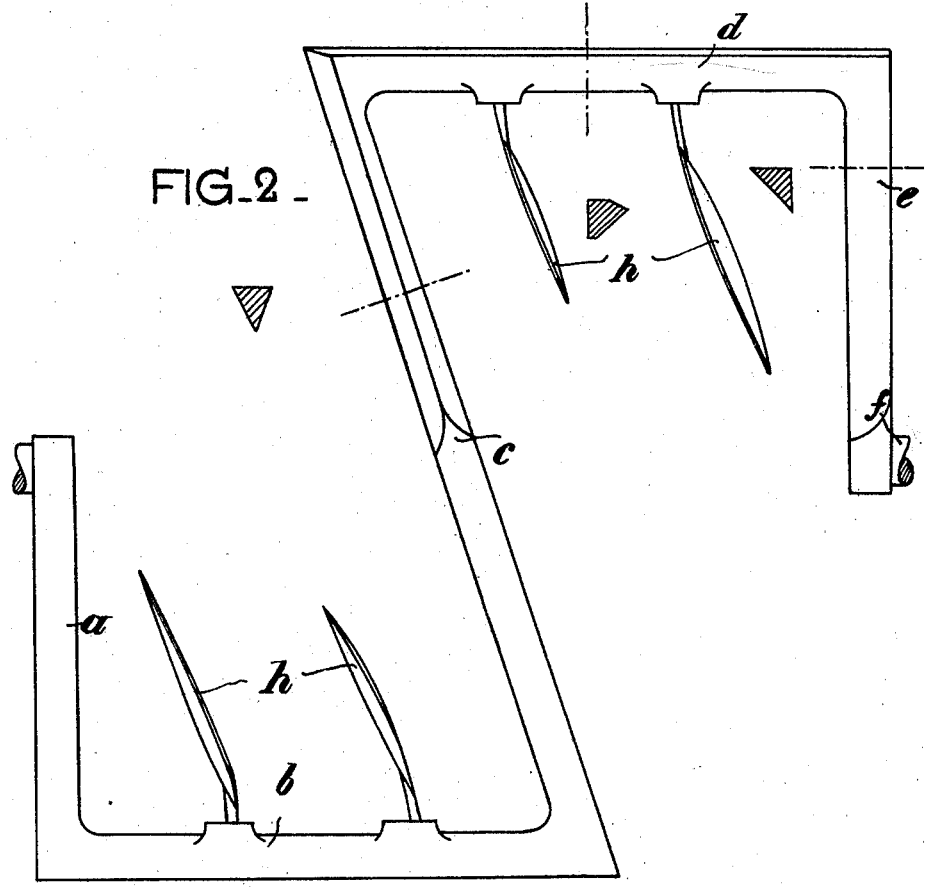

In the annexed drawings, Figure 1 is a side elevation, partly in section, showing the arrangement of the agitator in a kneading-machine; and Fig. 2 is a side elevation showing the agitator to an enlarged scale.

The agitator $a\,b\,c\,d\,e$ is substantially Z-shaped, its middle bar $c$ forming an acute angle with the two adjoining arms $b\,d$. Owing to this shape of the agitator the thorough working of the material is insured. As the corner formed by the bar $c$ and the adjoining arm $b$ corresponds in position to the middle of the arm $d$, and the corner formed by the bar $c$ and the adjoining arm $d$ corresponds in position to the middle of the arm $b$, these corners in the rotation of the agitator will pass into and divide the strips of dough which are formed by one-half of the bar $c$, the arm $d$, and the arm $e$, connected with a journal $f$, and by the other half of the bar $c$, the arm $b$, and the arm $a$, likewise connected with a journal $f$.

In order to facilitate the passage of the agitator through the dough to produce the strip, the edges of the agitator which first penetrate into the dough are sharpened. As shown by the transverse sections in Fig. 2, the outer edges of the arms $a\,b$ and $d\,e$ constitute cutting edges, while the connecting-bar $c$ has a cutting edge in the middle. By knives $h$, which are fastened to the arms $b$ and $d$ and are inclined thereto and whose faces form angles with the plane passing through the agitator, the dough will likewise be divided and will be moved in the direction of the axis of the trough $g$, wherein the agitator works.

At both its ends the kneader is suitably supported in slides $k$ for enabling it to be easily removed from the trough.

What I claim as my invention, and desire to secure by Letters Patent, is—

A kneader for dough-kneading machines, comprising a Z-shaped rotary agitator whose middle bar forms an acute angle with the adjoining arms which carry knives inclined thereto and having faces inclined to the plane of the kneader.

In testimony whereof I have signed my name to this specification in the presence of two subscribing witnesses.

OSKAR DROSCHÜTZ. [L. S.]

Witnesses:
 WILLIAM K. HERZOG,
 FRITZ HIMER.